United States Patent [19]
Seo

[11] Patent Number: 5,726,434
[45] Date of Patent: Mar. 10, 1998

[54] ENCODED SYMBOL READER

[75] Inventor: Shuzo Seo, Tokyo, Japan

[73] Assignee: Asahi Kogaku Kogyo Kabushiki Kaisha, Tokyo, Japan

[21] Appl. No.: 804,966

[22] Filed: Feb. 24, 1997

Related U.S. Application Data

[63] Continuation of Ser. No. 413,942, Mar. 30, 1995, abandoned.

[30] Foreign Application Priority Data

Apr. 1, 1994 [JP] Japan .................. 6-087817

[51] Int. Cl.$^6$ ........................................ G06K 7/10
[52] U.S. Cl. ............................... 235/472; 235/462
[58] Field of Search ........................ 235/462, 472, 235/455, 454, 467; 250/566

[56] References Cited

U.S. PATENT DOCUMENTS

| | | | |
|---|---|---|---|
| 4,983,818 | 1/1991 | Knowles | 235/462 |
| 5,179,269 | 1/1993 | Horie et al. | 235/455 |
| 5,235,167 | 8/1993 | Dvorkis et al. | 235/462 |
| 5,349,497 | 9/1994 | Hanson et al. | 235/472 X |
| 5,371,348 | 12/1994 | Kumar et al. | 235/472 |
| 5,477,044 | 12/1995 | Aragon | 235/472 |
| 5,479,002 | 12/1995 | Heiman et al. | 235/472 |

FOREIGN PATENT DOCUMENTS

| | | | |
|---|---|---|---|
| 2083684 | 2/1990 | Japan . | |
| 3271879 | 11/1991 | Japan | 235/462 |
| 4034676 | 2/1992 | Japan | 235/462 |

OTHER PUBLICATIONS

Seo et al., "Lighting Apparatus for Symbol Reading Device," filed Sep. 9, 1994.
Aoki, "Encoded Symbol Reader," filed on Mar. 16, 1995.

Primary Examiner—Donald T. Hajec
Assistant Examiner—Thien Minh Le
Attorney, Agent, or Firm—Greenblum & Bernstein, P.L.C.

[57] ABSTRACT

An encoded symbol reader is provided with a joint between a reading head and a main body to allow the reading head to be positioned with respect to the main body. The joint can allow the reading head to rotate about one or two axes. The reading head can be provided with a positioning device to hold the reading head in a selected rotational position, and a returning device to return the head to be predetermined position after a rotational displacement.

25 Claims, 10 Drawing Sheets

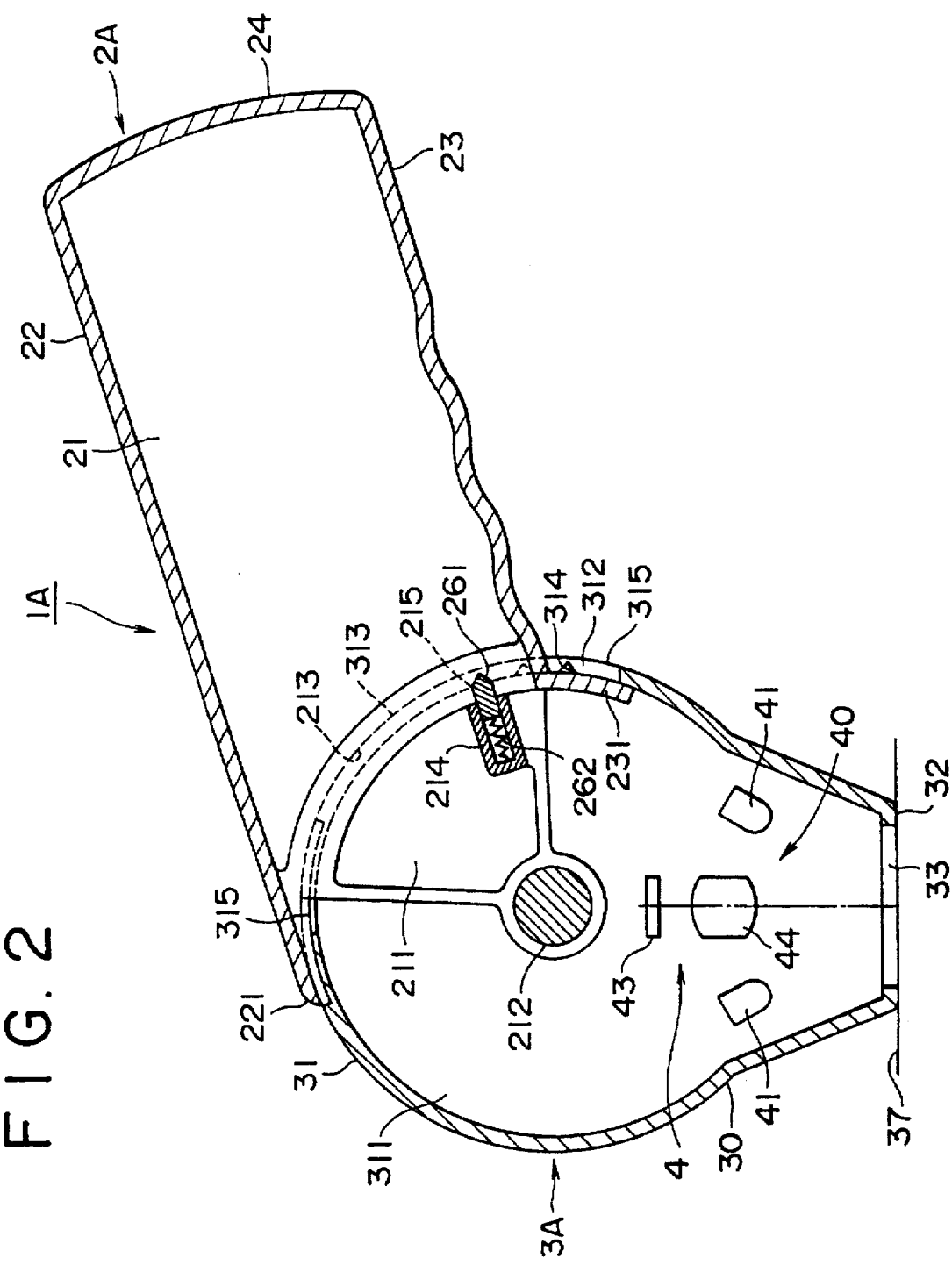

ENCODED SYMBOL READER

This application is a continuation, of application Ser. No. 08/413,942, filed Mar. 30, 1995, now abandoned.

BACKGROUND OF THE INVENTION

The present invention relates to encoded symbol readers, and specifically to encoded symbol readers having an articulated structure.

Modern point-of-sale systems employ encoded symbol readers to scan product bar-code labels, thereby increasing processing speed at store check-outs. However, conventional bar-code labels are scanned in only one dimension (i.e., a single scanning direction), and the bar-codes can only encode a small amount of data. More recently, a new type of symbol for representing data in two directions or along two dimensions has been proposed. This new type of symbol (hereinafter referred to as a tessellated code) uses a two-dimensional tessellated pattern to represent data.

A relatively simple scanning process is employed for conventional (single-direction or single-dimensional) bar-codes, and the angle between the reference surface on which the bar code is printed and the encoded symbol reader is not critical. Similarly, the distance between the printed bar-code and the light receptor of the encoded symbol reader is not critical.

If a simple scanning method is used to read tessellated codes, the positioning of the encoded symbol reader is crucial for decoding the appropriate information. If the angle between the code and reader is not within narrowly defined limits, the received image may be distorted and the wrong information may be decoded. Furthermore, the distance from the tessellated code to the light receptor of the encoded symbol reader is best kept constant in order to properly decode the tessellated code. Positioning the encoded symbol reader can be difficult if the tessellated code is not printed on a surface that is both flat and in a level position.

An area sensor has been developed for the encoded symbol reader in order to read the two-dimensional symbols, where the area sensor scans the entire tessellated pattern simultaneously, taking a "snapshot" of the encoded symbol. Alternatively, a line sensor may be used, where each line of encoded dots of the tessellated code is main scanned along the line, and auxiliary scanned from line to line. Either type of encoded symbol reader must be positioned such that the encoded symbol reader is at a target distance and angle (within certain tolerances) with respect to the tessellated code.

SUMMARY OF THE INVENTION

It is therefore an object of the present invention to provide an improved encoded symbol reader that allows flexibility between the relative positions of the user and an object bearing a symbol to be read. It is a further object of the present invention to provide an improved encoded symbol reader having an ergonomically superior positioning ability.

These objects are met by the invention by providing a symbol reader for reading encoded symbols encoded in two dimensions including a mechanism for reading the symbols which is, capable of illuminating and interpreting the encoded symbols. The symbol reader further includes a reading head housing the reading mechanism, a main body having a handle portion and supporting the reading head, and a mechanism for adjusting the position of the reading head with respect to the main body. Preferably, the adjusting mechanism includes mechanism for rotating the reading head with respect to the main body. For example, a rotatable support member may be associated with the main body for rotatably supporting the reading head. In this manner, the head can be positioned in a variety of positions depending on the relative positions of the operator and a surface bearing the encoded symbol. By coordinating the position of the reading head through with the symbol-bearing surface, the posture of the reader may be easily changed while still allowing accurate reading of the encoded symbol. The reading head is preferably provided with a contact portion which contacts a symbol-bearing surface when reading the symbol. The orientation of the reading head with respect to the main body can be determined by the contact between the reading head and the reference surface.

In one aspect of the present invention, the rotating mechanism includes mechanism for rotating the reading head about a single axis with respect to the main body. For example, the rotating mechanism includes at least one supporting strut provided to the main body and a shaft provided to the reading head. The shaft can be supported by the supporting strut and rotatable with respect to the supporting strut. As the reading head is swingable, alignment is more easily accomplished, and the invention is potentially more easily applied in automatic reading devices.

According to another aspect of the present invention, the rotating mechanism includes mechanism for rotating the reading head about two mutually perpendicular axes with respect to the main body. For example, the rotating mechanism includes a gimbal joint having first and second perpendicularly intersecting axes, where the first axis is rotatably supported by the main body and the second axis rotatably supports the reading head.

In yet another aspect of the present invention, the symbol reader further includes at least one resilient member for returning the reading head to a predetermined position after the reading head is displaced from the predetermined position. In this case the resilient member is coupled to the reading head and to the main body. Optionally, a plurality of resilient members are coupled between the reading head and the main body, such that the plurality of resilient members are able to return the reading head to the predetermined position after the reading head is rotationally displaced. When the reading head is controlled to return to a neutral position, it becomes easier to control automated operation.

According to still another aspect of the present invention, the symbol reader further includes a positioning mechanism for positioning the reading head at a predetermined orientation selected from a plurality of predetermined orientations. For example, the positioning mechanism includes a sliding contact member positioned between the reading head and the main body. Alternatively, the positioning mechanism includes (a) a plurality of detent notches provided to one of the reading head or the main body, and (b) a resiliently mounted detent pin provided to a remaining one of the reading head or the main body. The reading head may be easily held in a chosen position, and the symbol reader may be easily repetitively used. The operator may select from a variety of desired reading positions.

BRIEF DESCRIPTION OF THE DRAWINGS

FIG. 2 is a second view of the encoded symbol reader of FIG. 1, showing the reading head in a second angular position;

DESCRIPTION OF THE EMBODIMENTS

Figure 1:
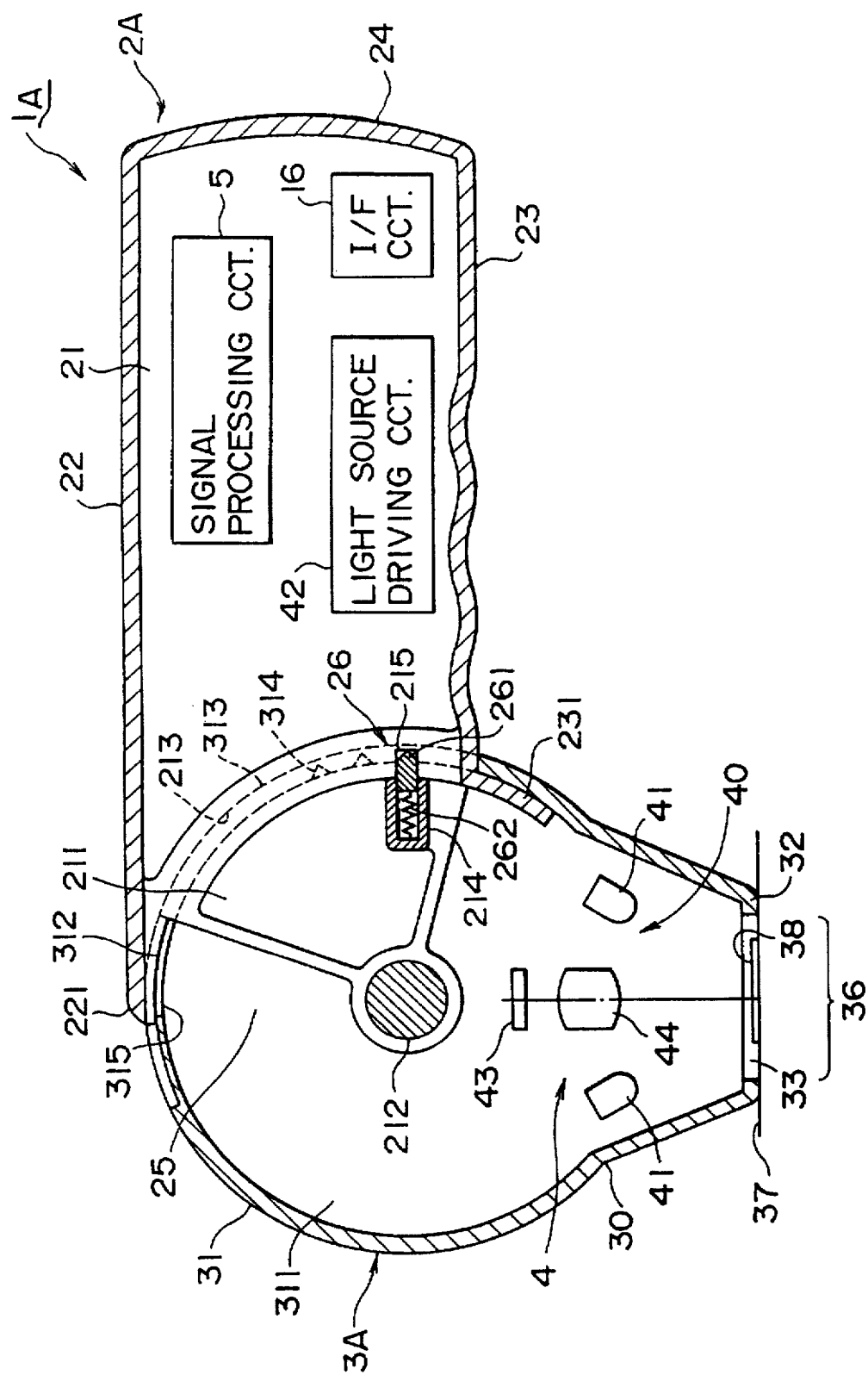
FIG. 1 is a side sectional view of a first embodiment of an encoded symbol reader according to the present invention, showing a first angular position of a reading head.

FIG. 1 shows an encoded symbol reader 1A according to a first embodiment of the present invention. The encoded symbol reader 1A includes a main body 2A, a reading head 3A and a reading system 4. A signal processing circuit 5, a light source driving circuit 42, and an interface circuit 16 are provided in the main body 2A.

The main body 2A is substantially rectangularly shaped and is made up of a pair of side surfaces 21, 21, an upper surface 22, a lower surface 23, and a back plate 24. Further, an opening 25 is provided between the side surfaces 21, 21 in the main body 2A to provide access to the reading head 3A. The upper surface 22 is provided with a top shield 221, while the lower surface 23 is provided with an inner shield 231. The top and bottom shields 221, 231 are curved to follow the same arc as an external wall 313 of the reading head 3A. The top shield 221 covers one end of an opening 312 in the reading head 3A (described below), while the inner shield 231 blocks the remaining end of the opening 312. A triangular strut 211 is provided to each side wall 21.

Referring now also to FIG. 3, the struts 211 extend away from the main body 2A from either side 21, 21, and are also contiguous with the top and bottom plates 22, 23. Each support strut 211 is substantially triangular, and an integral bushing 211a at the end of each strut 211, 211 rotatably supports a shaft 212 of reading head 3A (coaxial with the center of rotation of the reading head 3A), such that the reading head 3A is rotatable relative to the main body 2A. An arcuate groove 213, having an arc center coaxial with the shaft 212, is formed at the base of each strut 211. The arcuate groove is shaped to fit (with some clearance) the outer wall 313 of the reading head 3A, and the outer surfaces of the top and bottom shields 221 and 231 are contiguous with one wall of the groove 213.

A positioning system 26 is provided to one support strut 211. The positioning system 26 includes an integral detent pin housing 214, extending from the support strut 211 towards the interior of the main body 2A. A cavity 215 in the detent pin housing 214 extends into the arcuate groove 213 at the base of the support 211. The detent pin housing 214 houses a detent pin 261, which is biased away from the arc center of the groove 213 by a coil spring 262. The detent pin 261 penetrates into the arcuate groove 213 through the cavity 215, and is held in the cavity 215 by a plate cover 263 (as shown in FIG. 3). The positioning system 26 may be provided to either of support strut 211. Further, the positioning system 26 may be alternatively provided to the convex side of the arc of the groove 213; that is, housed in the main body 2A and operating from the opposite side of the arcuate groove 213 to that shown in FIGS. 1 through 3. The coil spring 262 may alternatively be a different means of resilient biasing, such as a plate spring.

When the reading head 3A is rotated such that the detent pin 261 is lined up with detent notches 314, the detent pin 261 (biased by the coil spring 262) engages the notch 314. By further rotating the reading head 3A, the detent pin 261 is pushed out of the notch 314 against the force of the coil spring 262, after which the reading head may be easily rotated. The detent pin 261 engages the next notch 314 when the detent pin 261 lines up with the next notch 314.

As shown in FIGS. 1 and 2, a tessellated symbol 38 is placed on a reference surface 37 of a symbol reading area 36. The reading head 3A consists of a reading extension 30 extending from a housing 31, and the reading extension 30 includes a contact portion 32 that can contact the reference plane 37 when reading an encoded symbol 38. The size of a reading window 33 is defined by the shape of the contact portion 32. The reading head 3A further includes side surfaces 311, 311 through which the shaft 212 passes, and the reading head 3 is rotatable about the shaft 212.

Figure 3A:
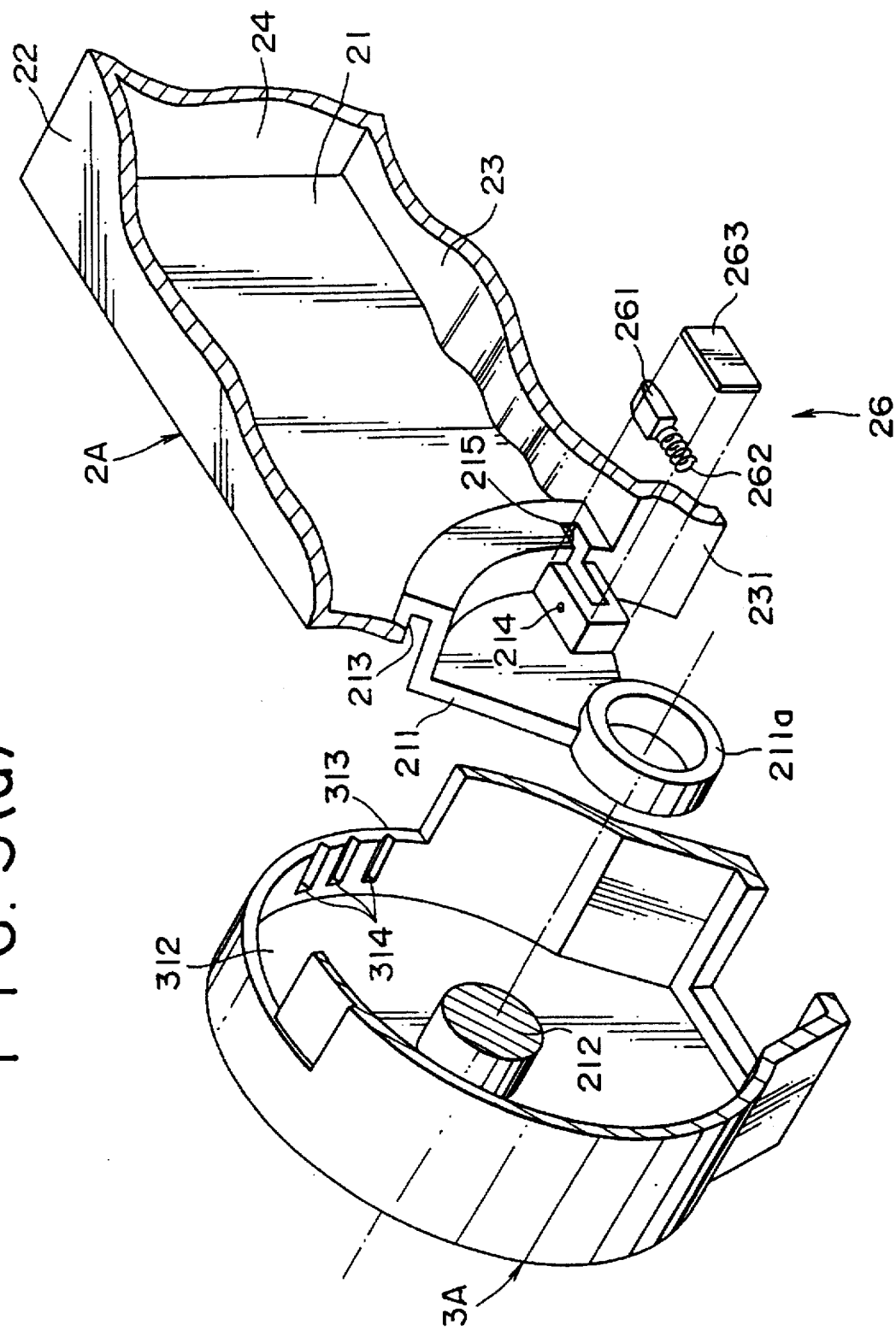
FIG. 3(a) shows an exploded cut-away perspective of portions of the encoded symbol reader of FIG. 1.
Figure 3B:
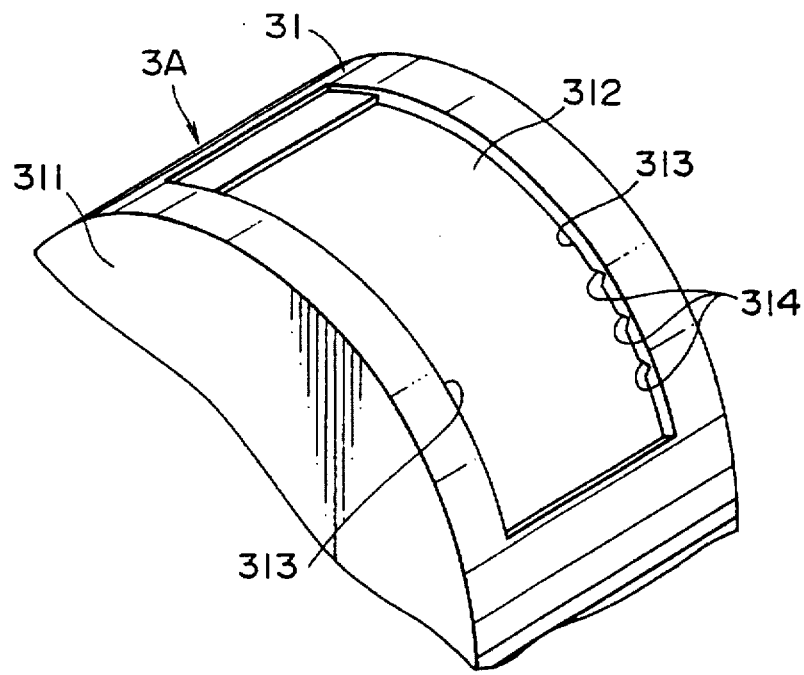
FIG. 3(b) shows a rear perspective view of the reading head of the encoded symbol reader of FIG. 1.

As shown in FIGS. 3(a) and 3(b), an arcuate rectangular opening 312 is provided in a circumferential portion of the housing 31. Side portions 211, 211 are fitted into the reading head 3A through the opening 312. Detent notches 314 are formed on the interior surface of the external wall, 313 and are able to receive the detent pin 261 of the positioning system 26. The shape of the notches 314 matches that of a contacting portion of the detent pin 261. Further, the length of the opening 312 (along the circumference of the external wall 313) is longer than the circumferential length of the side portions 211, thereby forming a gap 315 (FIGS. 1 and 2) in the opening 312. The reading head 3A can rotate, relative to the main body 2A, in the circumferential direction along the length of the gap 315. As shown in FIGS. 1 and 2, the gap 315 is always covered by the first and second shields 221, 231 in any position of the reading head 3A.

A reading module 4 is housed in the reading head 3A for illuminating the encoded symbol 38, sensing the image of the encoded symbol 38, and outputting an electrical signal corresponding to the sensed image. The reading module 4 includes a light source 40, a receiving element 43, and an optical system 44. The optical system 44 guides light reflected from the encoded symbol 38 towards the receiving element 43 to form an image thereon. In this first embodiment, the receiving element 43 is a charge coupled device (CCD, hereinafter referred to as CCD 43). The light source 40 consists of two illuminating devices 41, 41 and is controlled by a light source driving circuit 42. In this embodiment, the two illuminating devices 41, 41 are light emitting diodes (LEDs, hereinafter referred to as LEDs 41, 41). However, laser diodes or halogen lamps may alternatively be used as light source 40.

As shown in FIG. 1, the CCD 43 and the optical system 44 are positioned intermediate the two LEDs 41, 41. In this first embodiment, the CCD 43 is a two dimensional receiving device, having receiving pixels in both X and Y directions to form a matrix. Electric charges corresponding to light incident on each pixel are stored in the CCD 43 and then read out sequentially. In this first embodiment, the CCD 43 merely needs to distinguish brightness levels, since the encoded symbol 38 consists of black and white areas. Alternatively, if color symbols are to be read, a color-sensing CCD or CCDs may be employed. The optical system 44 can be formed by suitably combining lenses, prisms, filters or other optical elements.

Figure 4:
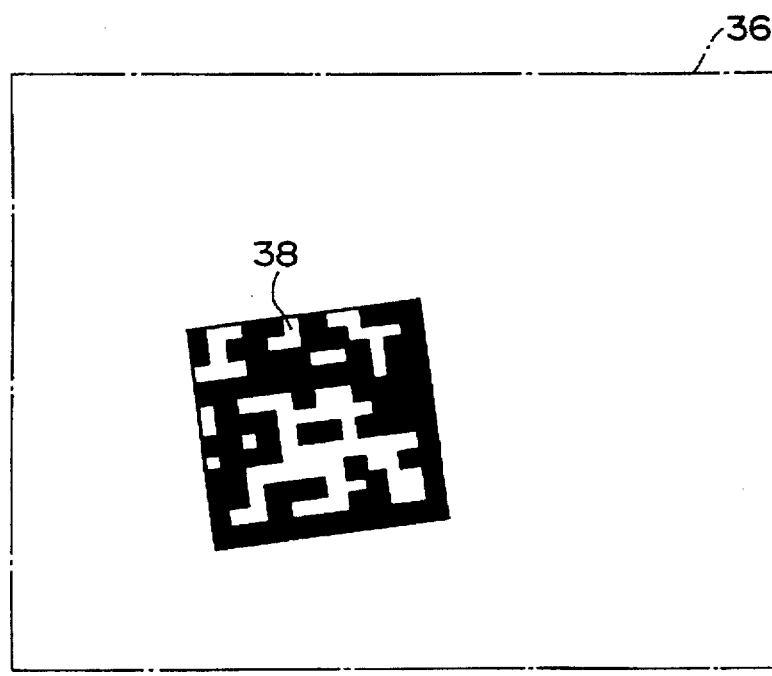
FIG. 4 is an example of a tessellated symbol recorded in a reading zone of the encoded symbol reader shown in FIG. 1.

FIG. 4 shows a plan view of the symbol reading area 36. The symbol reading area 36, shown by a dotted line, is the field in which light reflected by the encoded symbol 38 forms an image that is readable by the CCD 43. Encoded symbol 38 is a tessellated pattern having at least two rows and at least two columns of black and white (or transparent) blocks. The black and white blocks form a binary code, and each distinct black and white tessellated pattern represents different data. However, the invention is not limited to an encoded symbol 38 having a pattern as described.

Figure 5:
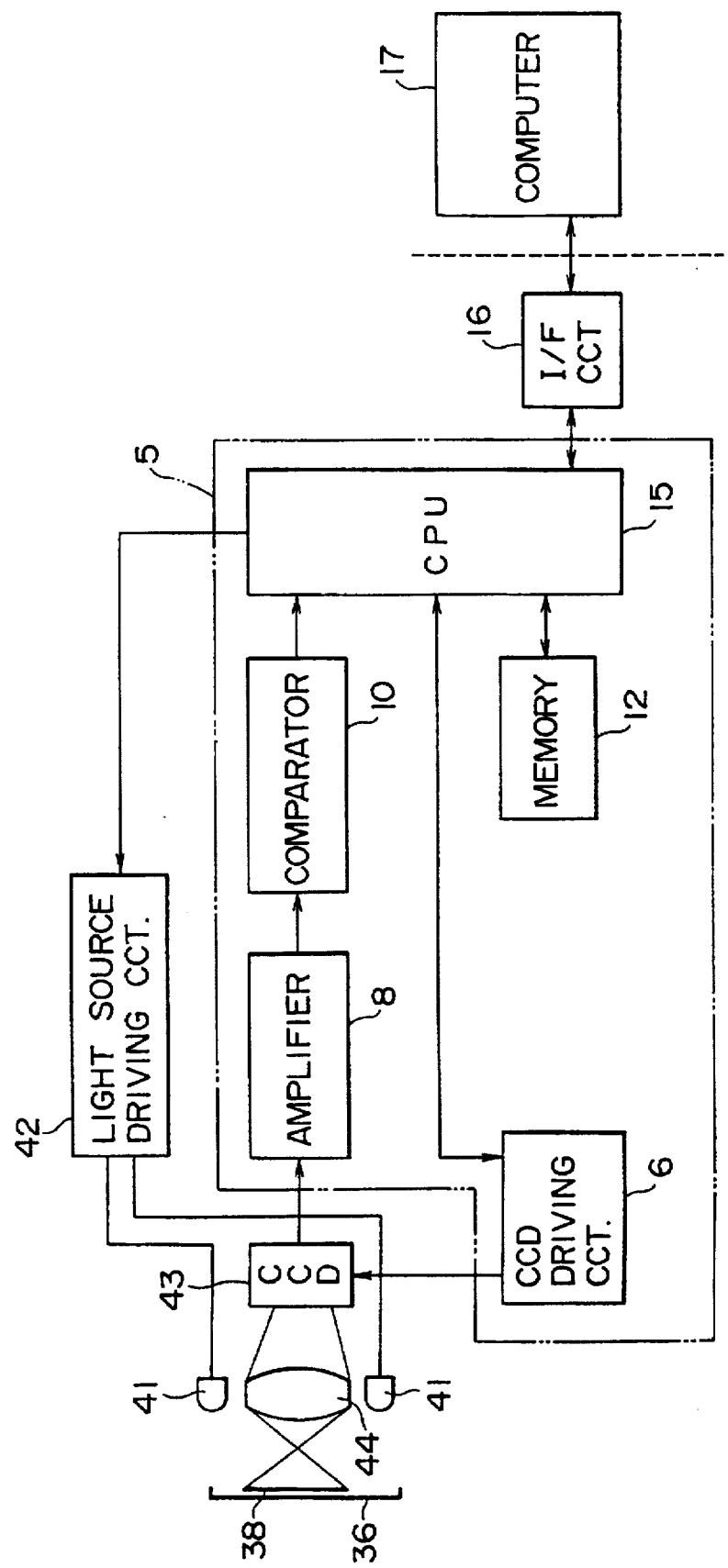
FIG. 5 is a block diagram representing the encoded symbol reader shown in FIG. 1.

FIG. 5 shows a block diagram representing the encoded symbol reader 1A. A signal processing circuit 5 controls the operation of the reading module 4 (shown in FIG. 1). The signal processing circuit 5 consists of a CCD driving circuit 6, an amplifier 8, a comparator 10, a memory 12 and a CPU 15. The CPU 15 sends a control signal to the light source driving circuit 42 to illuminate an encoded symbol 38, and the CCD 43 begins scanning. The CCD driving circuit 6 then sends a signal to control the CCD 43 to output image information, pixel by pixel, corresponding to the detected image, and the CCD 43 outputs an analog signal to the amplifier 8. For each pixel, the amplifier 8 amplifies the signal and feeds the signal to comparator 10. The comparator 10 compares the input signal with a predetermined threshold signal and outputs either a high or low signal (i.e., a binary signal) to the CPU 15. The CCD driver 6 outputs a clock signal to the CPU 15 and ensures synchronous transfer of the data from the CCD 43 to the CPU 15.

The binary data is stored at predetermined addresses in the memory 12 using an address counter (located in the CPU 15) driven by the clock signal output from the CCD driving circuit 6. The data is then sequentially read out from the memory 12 using the address counter of the CPU 15. For one picture frame of data, an arithmetic logic unit (ALU) of the CPU 15, can perform image processing such as detection of the outline of the symbol 38, detection of dropouts in the signal representing the symbol 38, and detection of the rotational orientation of the symbol 38. Further, the CPU 15 can decode the data corresponding to the encoded symbol 38. The decoded data is output to computer 17 through an interface circuit 16.

According to this first embodiment, the position of the reading head 3A relative to the main body 2A can be adjusted to accommodate the position of a product having an encoded symbol 38 to be scanned, or to accommodate the position of the person using the encoded symbol reader 1A. As shown in FIGS. 1 and 2, when the encoded symbol reader is to read, the contact surface 32 will be abutted to the reference plane 37. Therefore, the positions of the CCD 43 and the light source 40 with respect to the encoded symbol 38 are consistent for every reading. Furthermore, the reading head 3A can be set to a selected angle relative to the main body 2A by rotating the reading head 2A until the required angle has been achieved. The positioning system 26 maintains the angle, thereby improving the operability of the encoded symbol reader 1A.

Therefore, as described above, the angle of the reading head 3 relative to the main body can be easily adjusted.

Further, the angle of the reading head 3 can be maintained by the engagement of the contact pin 261 in one of the recesses 314. This facilitates the use of the encoded symbol reader 1A.

Figure 6:
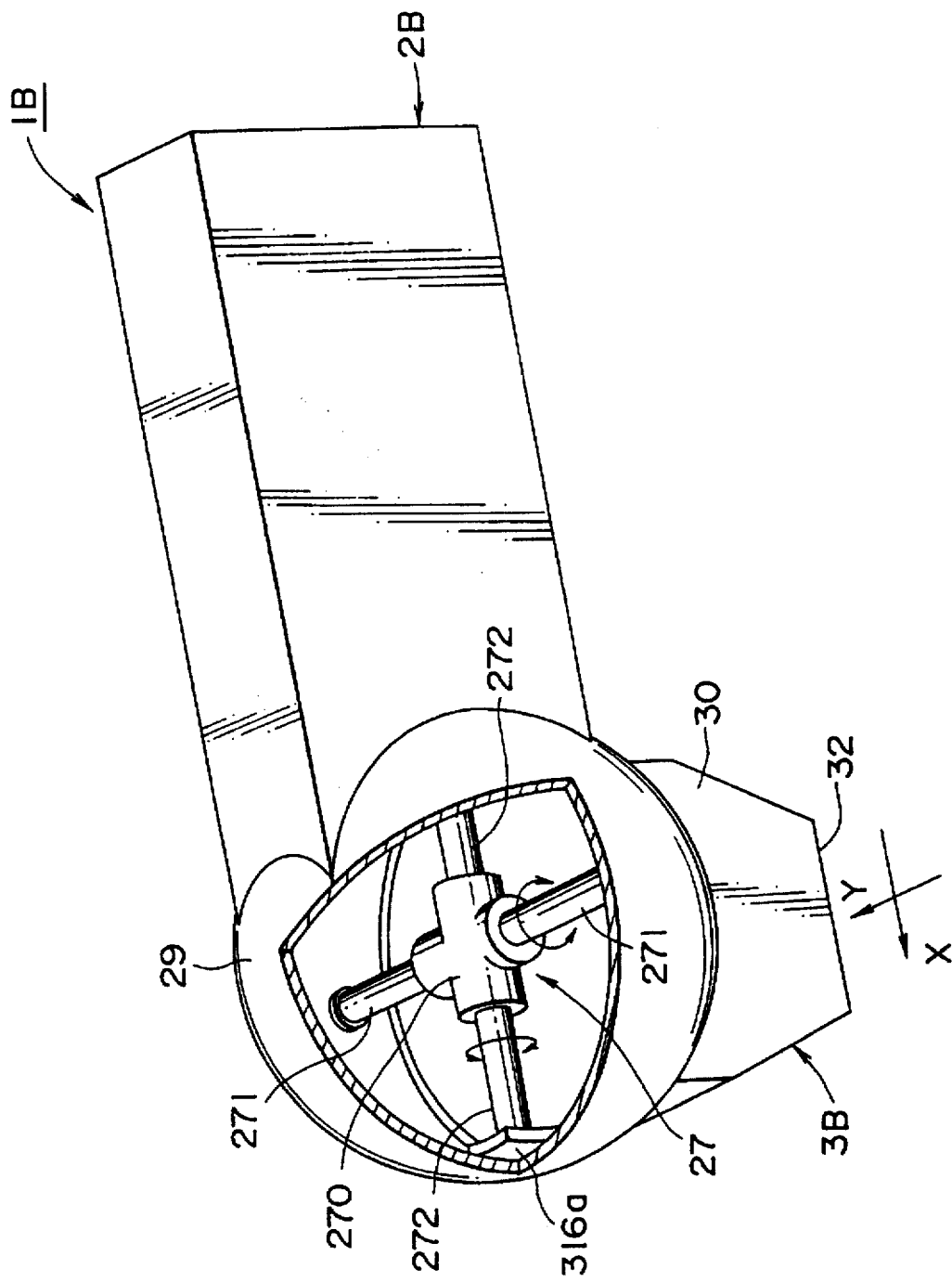
FIG. 6 is a partially cut-away perspective view of a second embodiment of an encoded symbol reader according to the present invention.
Figure 7:
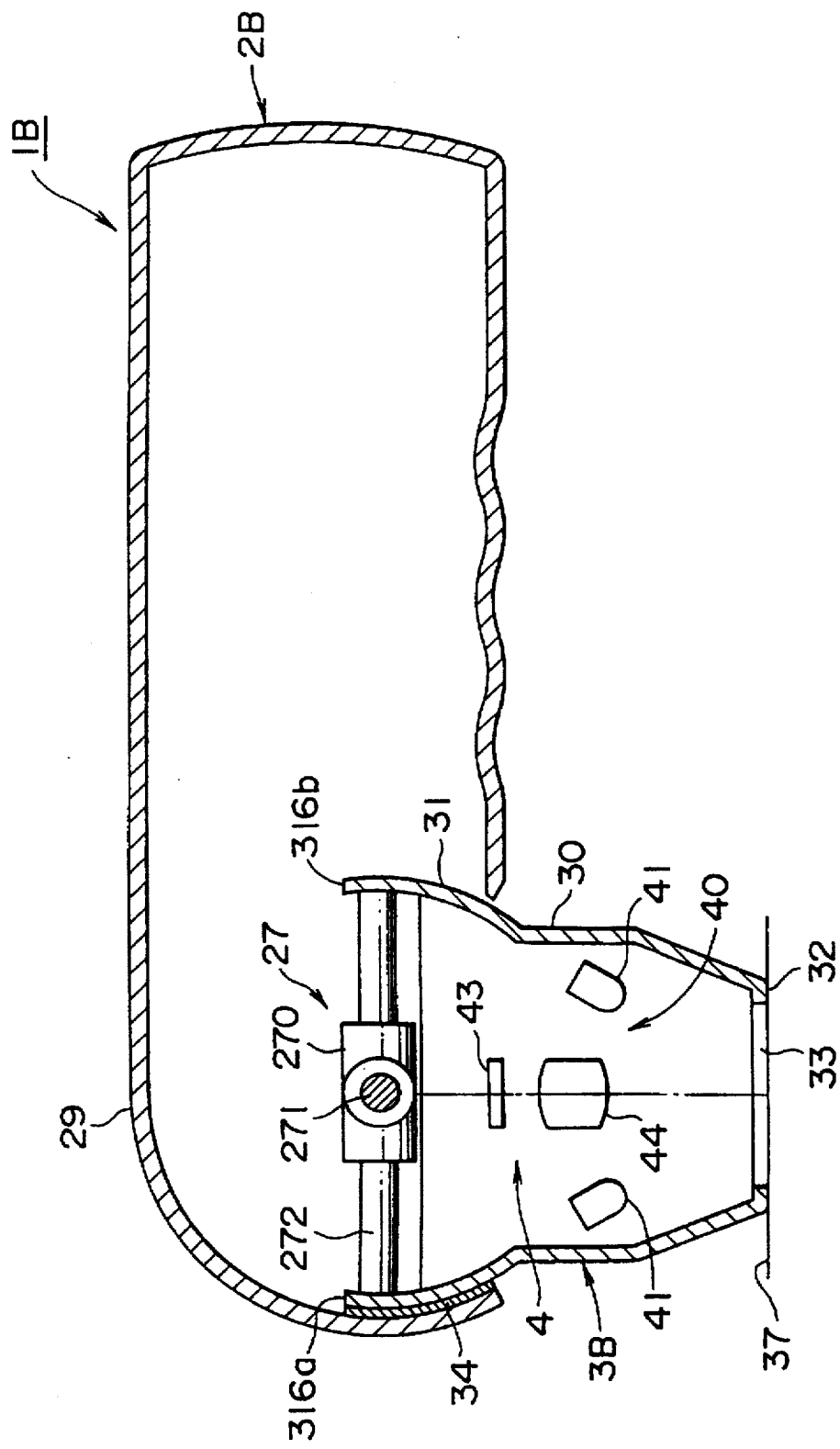
FIG. 7 is a side sectional view of the encoded symbol reader shown in FIG. 6, showing a first angular position of a reading head.

FIG. 6 shows a partially cut-away perspective view of a second embodiment, and FIG. 7 shows a side section view of the second embodiment. The second embodiment is similar to the first embodiment described above; similar elements are described hereafter having common reference numerals. The second embodiment also includes the signal processing circuit 5 and other image processing elements, identical to those of the first embodiment.

In the second embodiment, an encoded symbol reader 1B has a main body 2B, and a reading head 3B. The main body 2B has a mounting portion 29 for mounting the reading head 3B. The mounting portion 29 is formed having a spherical surface. A gimbal joint 27 is mounted to an inside surface of the mounting portion 29, and the reading head 3B is capable of rotating about the perpendicularly intersecting axes of the gimbal joint 27. The gimbal joint 27 consists of two rotatable shafts 271, 272 that are supported by the connector 270, and are arranged such that their axes of rotation are perpendicular to each other. As shown in FIG. 6, the rotatable shaft 271 is rotatably mounted to the inner wall of mounting portion 29. The rotatable shaft 272 is rotatably mounted to connecting portions 316a, 316b FIG. 1 of the reading extension 30 of the reading head 3B.

The reading extension 30 is formed having a spherical portion 31 and a contacting portion 32. The contacting portion 32 houses the reading module 4, as shown in FIG. 7. The reading module 4, the reading window 33 and the reference plane 37 are the identical to those described for the first embodiment above.

As further shown in FIG. 7, the spherical portion 31 of the reading head 3B is mounted inside the mounting portion 29 of the main body 2B. A frictional member 34 (such as rubber or synthetic fiber) is attached to an outer surface of the spherical portion 31. Furthermore, the frictional member 34 is arranged to always contact an inner surface of the mounting portion 29, since the spherical surface 31 always overlaps a section of the mounting portion 29. With this construction, light can only enter the inside of the reading head 3B through the reading window 33, even when the reading head 3B is rotated about the shafts 271, 272.

When the encoded symbol reader 2B is to read a symbol, the contacting portion 32 of the reading head 3B is placed against the reference plane 37. The reading head 3B rotates about the shafts 271, 272 until the reading window 33 of the contacting portion 32 is flush with the reference plane 37. The main body 2B can be adjusted to a more comfortable position for the user without affecting the alignment of the reading head 3B, by rotating the main body 2B about the shafts 271, 272 relative to the reading head 3B. Once the position of the reading head 3B has been adjusted, the frictional member 34 maintains the alignment of the reading head 3B, facilitating the use of the encoded symbol reader 2B.

Figure 8:
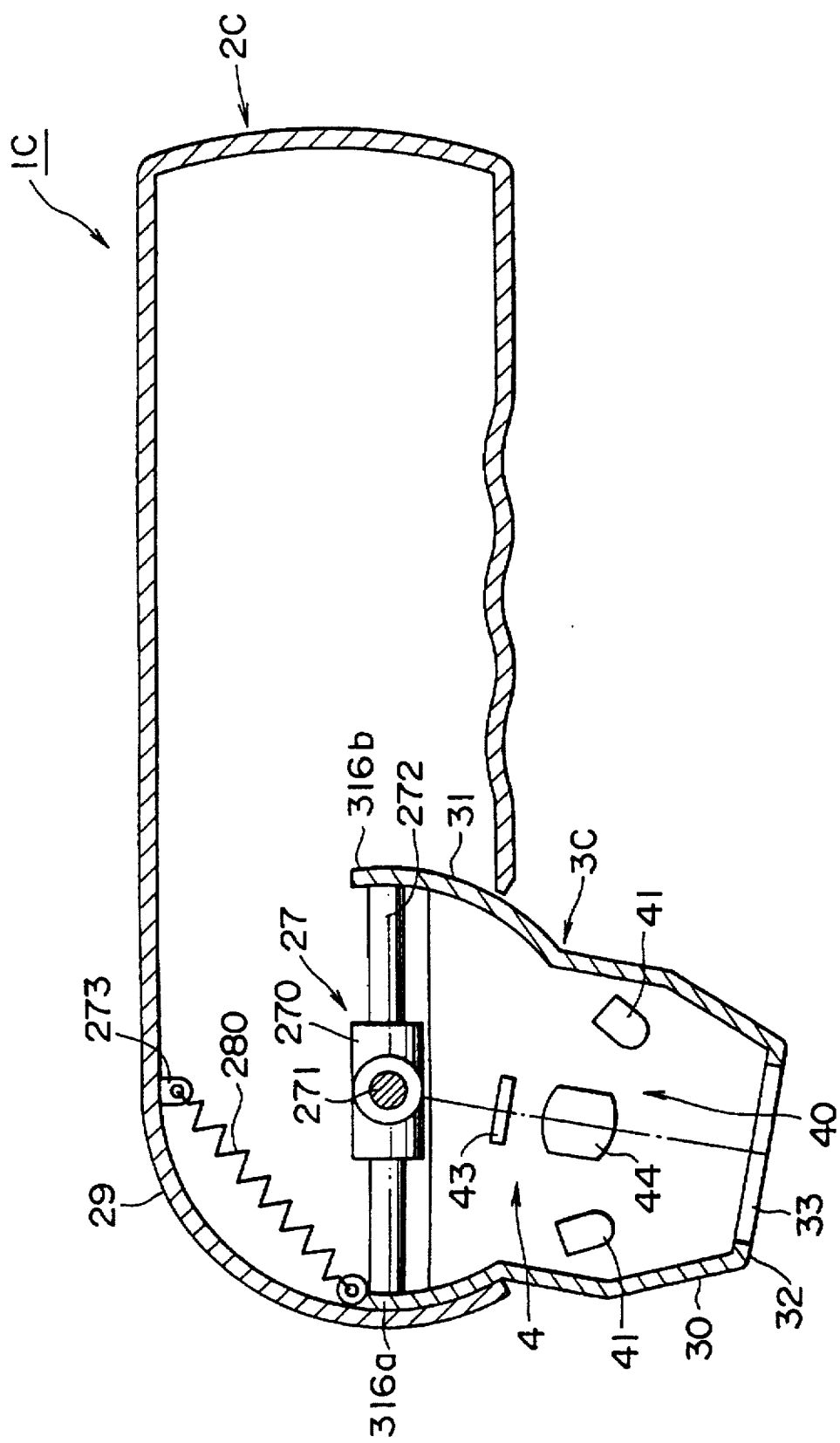
FIG. 8 is a side sectional view of a third embodiment of an encoded symbol reader according to the present invention, showing a second angular position of a reading head.

FIG. 8 shows a sectional side view of a third embodiment according to the present invention. This third embodiment is similar to the second embodiment described above, with similar elements having common reference numerals. In the third embodiment, an encoded symbol reader 1C has a main body 2C and a reading head 3C. In this embodiment, a resilient member 280, such as a spring, is connected between connecting portion 316a and connecting tab 273.

With this construction, when the encoded symbol reader 1C reads the symbol 38, the reading head 3C is moved until the contact portion 32 is flush with the reference plane 37, as described for the second embodiment above. However, when the encoded symbol reader 1C is repositioned such that the contact portion 32 no longer contacts the reference plane 37, the biasing member 280 returns the reading head 3C to its resting position, shown in FIG. 8. Since the reading head 3C is automatically repositioned to its resting position whenever the contact portion 32 is moved out of contact with the reference plane, the encoded symbol reader 3C can be used with automatic scanning systems. Further, if there are many users of the encoded symbol reader 3C, each new user needs to adjust the reading head 3C only from the resting position, which is independent of the position of the reading head 3C set by a previous user.

Figure 9:
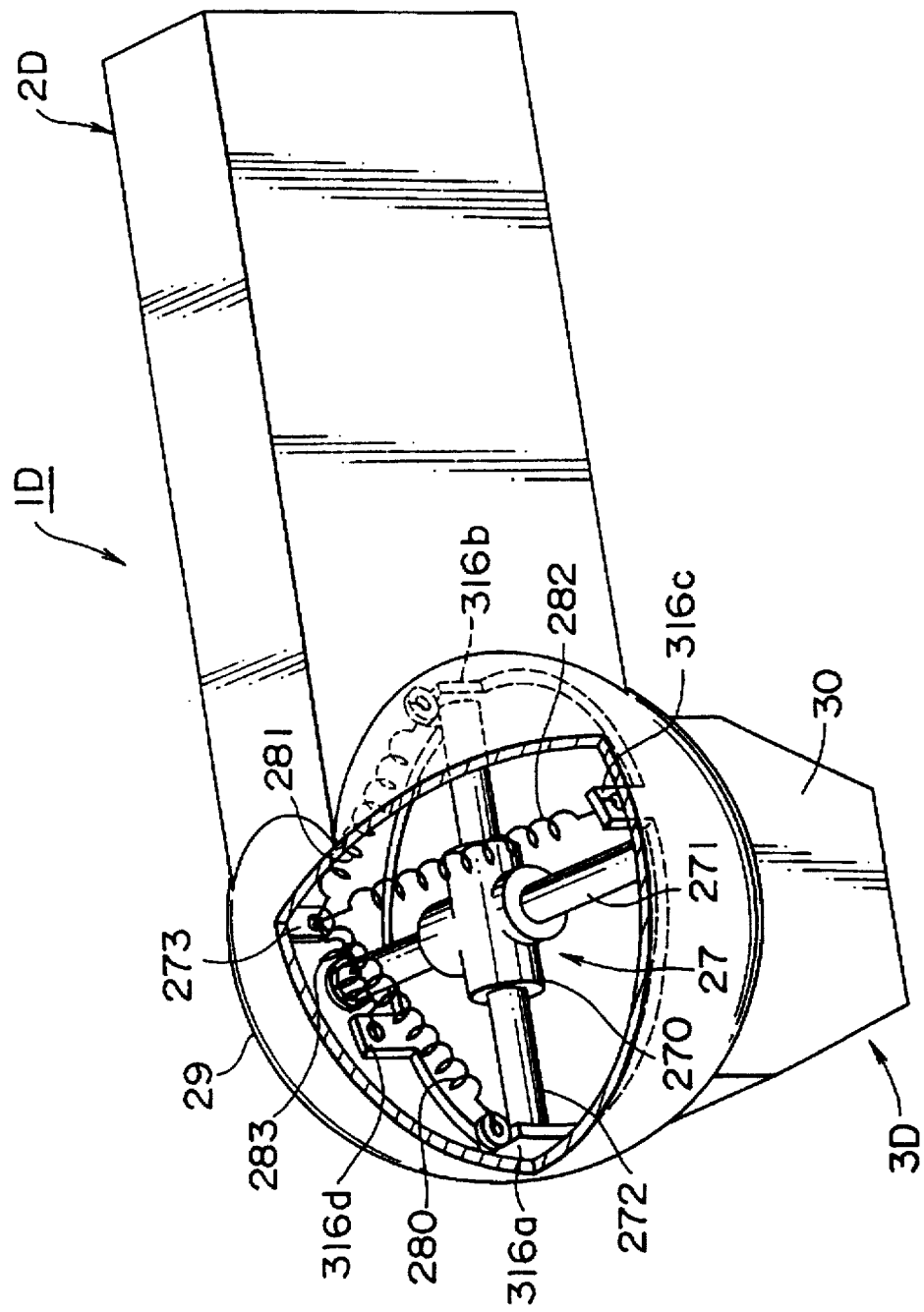
FIG. 9 is a partially cut-away perspective view of a fourth embodiment of an encoded symbol reader according to the present invention.
Figure 10:
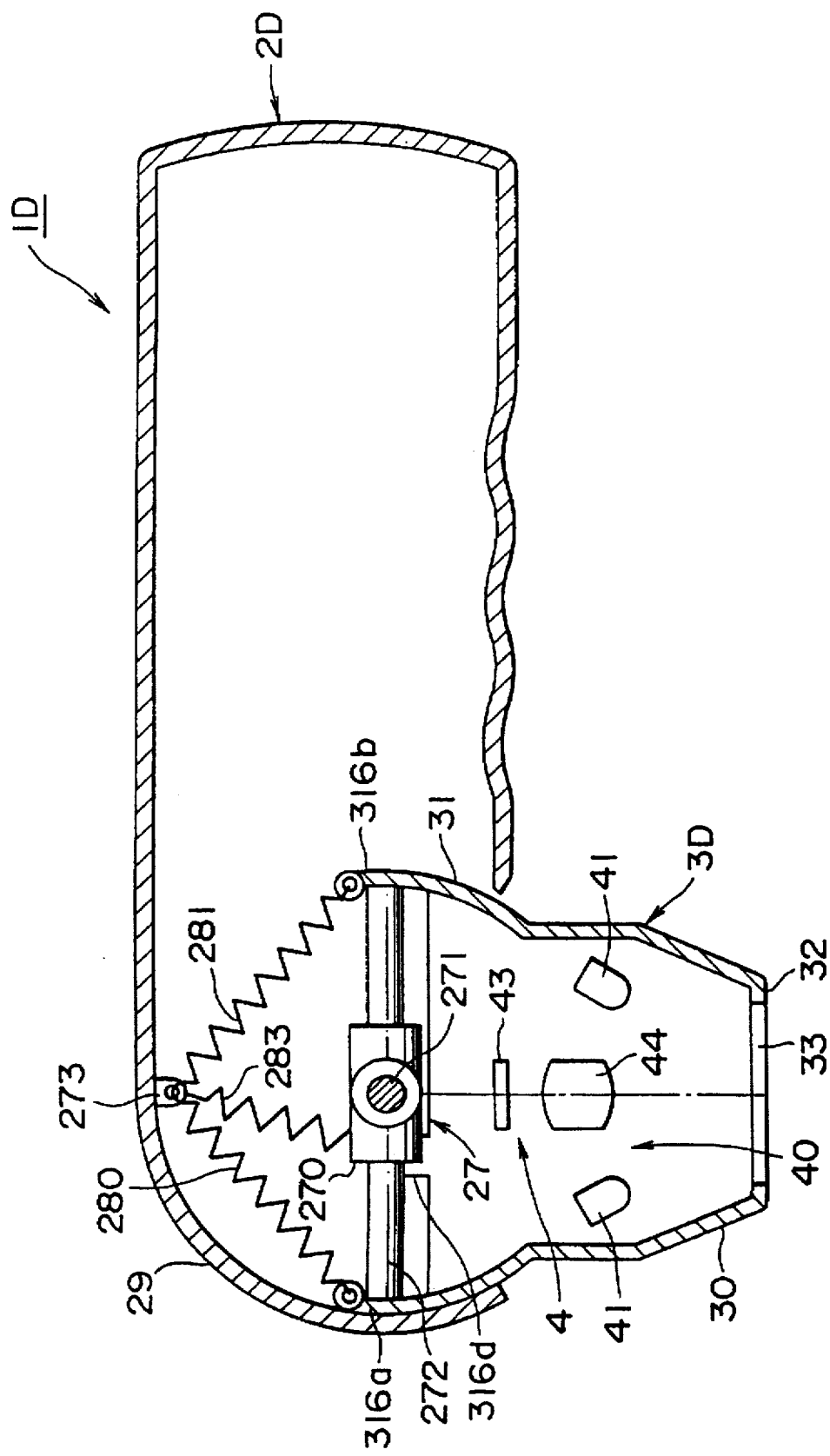
FIG. 10 is a side sectional view of the encoded symbol reader shown in FIG. 9, showing a first angular position of a reading head.

FIG. 9 is a partially cut-away perspective view of a fourth embodiment, and FIG. 10 is a side sectional view of the fourth embodiment. The fourth embodiment is similar to the second and third embodiments described above, with similar elements having common reference numerals. Description of parts of the main body 2D and the reading head 3D that are similar to those of the second and third embodiments, are therefore omitted.

In the case of the fourth embodiment, in addition to the resilient member 280, three additional resilient members 281, 282 and 283 are provided between the main body 2D and the reading head 3D. Connection portions 316a and 316b are provided near opposite ends of shaft 272, and connection portions 316c and 316d are provided near opposite ends of shaft 271. One end of each of the resilient members 280 through 283 is connected to the connecting tab 273. Of the remaining ends of the coil springs, the ends of resilient members 280 and 281 are connected to connection portions 316a and 316b, respectively, and the ends of resilient members 282 and 283 are connected to connection portions 316c and 316d, respectively. Thus, as the connection portions 316a and 316b are provided near opposite ends of shaft 272, and connection portions 316c and 316d are provided near opposite ends of shaft 271, a substantially equal restoring force is provided to whichever of connection portions 316a through 316d (and corresponding shaft ends) are displaced from a neutral position shown in FIGS. 9 and 10. After the reading head 3D is rotated away from the neutral position by some displacing force, such as application of the reading head 3D to a surface bearing a symbol, the reading head 3D returns to the neutral position as soon as the force is removed. The neutral position is defined as the position where the biasing forces from each of the four resilient members 280 through 283 are balanced, and is arranged to be in a position where the reading head 3D is at right angles to the main body 2D in both directions of possible rotational freedom. However, the neutral position may be set to any desired position by adjusting the respective biasing forces of the resilient members 280 through 283, or by selecting the locations of the connection of the springs 280 through 283 to the reading head 3D to be displaced from the ends of the shafts 271 and 272. Furthermore, the number of resilient members connected between connecting tab 273 and the reading head 3D may be alternatively two, three or more than four resilient members.

The reading heads of the first through fourth embodiments are constructed rigidly and arranged to fit the main body; however, the reading head may be connected to the main body by a bellows that allows movement in any direction. The reading heads of the second through fourth embodiments as disclosed may rotate about two mutually perpendicular axes. Further, the second through fourth embodiments may employ a positioning device 26 as disclosed in the description of the first embodiment, to retain a selected position of the reading head between uses. Moreover, the resilient member in the third and fourth embodiments is disclosed as a spring, but the invention may use any resilient means, i.e., a plate spring, torsion spring, or rubber member. The invention may be further applied to readers for other types of symbols not disclosed herein. Furthermore, although the disclosed embodiments are designed to be hand-held, the disclosed configurations of main body and reading head may be used in an automatic or robotic device.

Thus, according to the described embodiments, the main bodies 1A through 1D are designed to be held in the hand, and by coordinating the position of the reading heads 3A through 3D with the reference surface 37, the posture of the readers 1A through 1D may be easily changed while still allowing accurate reading of the encoded symbol 38. The reading operation becomes convenient and precise, and can prevent errors or misreading. Accordingly, the operator is less subject to fatigue.

Particularly, as the reading head is swingable, alignment is more easily accomplished, and the invention is potentially more easily applied in automatic reading devices. Furthermore, as the reading head may be easily held in a chosen position, the symbol reader may be more easily used repetitively, and the operator may select from a variety of desired reading positions. When the reading head is not provided with a positioning device, the operation of the encoded symbol reader is more suitable for generalized use. When the reading head is controlled to return to a neutral position, it becomes easier to control automated operation.

The present disclosure relates to subject matter contained in Japanese Patent Application No. HEI 6-087817 filed on Apr. 1, 1994, which is expressly incorporated herein by reference in its entirety.

What is claimed is:

1. A symbol reader for reading symbols encoded in two dimensions, said symbol reader comprising:
   means for reading said symbols, said reading means being capable of illuminating and interpreting said symbols;
   a reading head, housing said reading means;
   a main body, said main body having a handle portion that supports said reading head; and
   means for adjusting a position of said reading head with respect to said main body, said adjusting means being enclosed within said reading head, said adjusting means having a groove formed at a base of said adjusting means, said adjusting means rotating about a shaft relative to said main body, said groove engaging an outer wall of said reading head.

2. The symbol reader according to claim 1,
   wherein said adjusting means comprises means for rotating said reading head with respect to said main body.

3. The symbol reader according to claim 2,
   wherein said rotating means comprises a rotatable support member associated with said main body for rotatably supporting said reading head.

4. The symbol reader according to claim 2,
   wherein said rotating means comprises means for rotating said reading head about a single axis with respect to said main body.

5. The symbol reader according to claim 4,
   wherein said rotating means comprises at least one supporting strut provided to said main body and a shaft provided to said reading head, said shaft supported by said supporting strut and said shaft being rotatable with respect to said supporting strut.

6. A symbol reader for reading symbols encoded in two dimensions, said symbol reader comprising:

means for reading said symbols, said reading means being capable of illuminating and interpreting said symbols;

a reading head, housing said reading means;

a main body, said main body having a handle portion that supports said reading head; and means for rotating said reading head with respect to said main body, said rotating means being enclosed within said reading head, said rotating means comprising means for rotating said reading head about two mutually perpendicular axes with respect to said main body.

7. The symbol reader according to claim 6, wherein said rotating means comprises a gimbal joint having first and second perpendicularly intersecting axes, said first axis being rotatably supported by said main body and said second axis rotatably supporting said reading head.

8. The symbol reader according to claim 7, wherein said symbol reader further comprises at least one resilient member for returning said reading head to a predetermined position after said reading head is rotationally displaced from said predetermined position, said at least one resilient member being coupled at one end to said reading head and coupled at a remaining end to said main body.

9. The symbol reader according to claim 8, wherein a plurality of resilient members are coupled between said reading head and said main body, and wherein said plurality of resilient members are able to return said reading head to said predetermined position after said reading head is rotationally displaced from said predetermined position about both of said first and second axes.

10. The symbol reader according to claim 1, wherein said symbol reader further comprises positioning means for positioning said reading head at a predetermined orientation selected from a plurality of predetermined orientations.

11. The symbol reader according to claim 10, wherein said positioning means comprises a sliding contact member positioned between said reading head and said main body.

12. The symbol reader according to claim 11, wherein said positioning means further comprises a plurality of detent notches provided to one of said reading head or said main body, and a resiliently mounted detent pin provided to a remaining one of said reading head or said main body.

13. The symbol reader according to claim 1, wherein said symbol reader further comprises means for returning said reading head to a predetermined position after said reading head is displaced from said predetermined position.

14. The symbol reader according to claim 13, wherein said returning means comprises at least one resilient member associated with said reading head.

15. The symbol reader according to claim 14, wherein said predetermined position is a neutral position.

16. The symbol reader according to claim 14, wherein said at least one resilient member is coupled at one end to said reading head and coupled at a remaining end to said main body.

17. The symbol reader according to claim 1, wherein said reading head is provided with a contact portion which contacts a reference surface upon which said symbol is provided when reading said symbol, and wherein an orientation of said reading head with respect to said main body is determined by said contact between said reading head and said reference surface.

18. The symbol reader according to claim 1, wherein said reading means comprises an illuminating device and an image receiving device, and said reading head having a window formed therein through which said illuminating device can illuminate said encoded symbols and said image reading device can receive an image of said encoded symbols.

19. A symbol reader for reading symbols encoded in two dimensions, said symbol reader comprising:

an illuminating device;

an image receiving device;

a reading head for holding said illuminating device and said image reading device, said reading head having a window formed therein through which said illuminating device can illuminate said encoded symbols and said image reading device can receive an image of said encoded symbols;

a main body, said main body including a handle portion; and a joint provided between said main body and said reading head within said reading head, said joint having a groove formed therein, said groove engaging an outer wall of said reading head to allow said reading head to be adjustably positioned with reference to said main body.

20. The symbol reader according to claim 19, wherein said joint comprises means for rotating said reading head with reference to said main body.

21. A symbol reader for reading symbols encoded in two dimensions, said symbol reader comprising:

an illuminating device;

an image receiving device;

a reading head that holds said illuminating device and said image reading device, said reading head having a window formed therein through which said illuminating device can illuminate said encoded symbols and said image reading device can receive an image of said encoded symbols;

a main body, said main body including a handle portion; and a rotating device provided between said main body and said reading head within said reading head, said rotating device allowing said reading head to be adjustably positioned with reference to said main body, wherein said rotating device rotates said reading head about two mutually perpendicular axes with respect to said main body.

22. A symbol reader for reading symbols encoded in two dimensions, said symbol reader comprising:

an illuminating device;

a charge coupled device for receiving images;

a reading head for holding said illuminating device and said charge coupled device, said reading head having a window formed therein through which said illuminating device can illuminate said encoded symbols and said charge coupled device can receive an image of said encoded symbols;

a main body having a handle portion; and a joint provided between said main body and said reading head within said reading head, said reading head being rotatable about an axis of said joint, said axis being rotatably supported by said main body, said joint including a groove formed therein that engages an outer wall of said reading head.

23. A symbol reader for reading symbols encoded in two dimensions, said symbol reader comprising:

an illuminating device;

a charge coupled device for receiving images;

a reading head for holding said illuminating device and said charge coupled device, said reading head having a window formed therein through which said illuminating device can illuminate said encoded symbols and said charge coupled device can receive an image of said encoded symbols;

a main body having a handle portion; and a joint provided between said main body and said reading head within said reading head, said reading head being rotatable about an axis of said joint, said axis being rotatably supported by said main body, wherein said joint comprises means for rotating said reading head about two mutually perpendicular axes with respect to said main body.

24. A symbol reader for reading symbols encoded in two dimensions, comprising:

a reading device that reads said symbols, said reading device being capable of illuminating and interpreting said symbols;

a reading head that houses said reading device;

a main body having a handle portion that supports said reading head; and an adjuster, positioned within said reading head, that rotatably adjusts a position of said reading head about a plurality of substantially mutually perpendicular axes with respect to said main body.

25. A symbol reader for reading symbols encoded in two dimensions, comprising:

a reading device that reads said symbols, said reading device being capable of illuminating and interpreting said symbols;

a reading head that houses said reading device;

a main body having a handle portion that supports said reading head; and an adjuster, positioned within said reading head, that rotatably adjusts a position of said reading head about a single axis with respect to said main body, said adjuster including a groove formed therein that engages an outer wall of said reading head.

* * * * *